Feb. 24, 1931.    R. G. DE LA MATER    1,793,735
AUTOMATIC ACCELERATING FRICTION CLUTCH
Filed April 12, 1929    2 Sheets-Sheet 1

Inventor
Robert Griffin De La Mater
By Attorneys

Feb. 24, 1931.  R. G. DE LA MATER  1,793,735
AUTOMATIC ACCELERATING FRICTION CLUTCH
Filed April 12, 1929  2 Sheets-Sheet 2
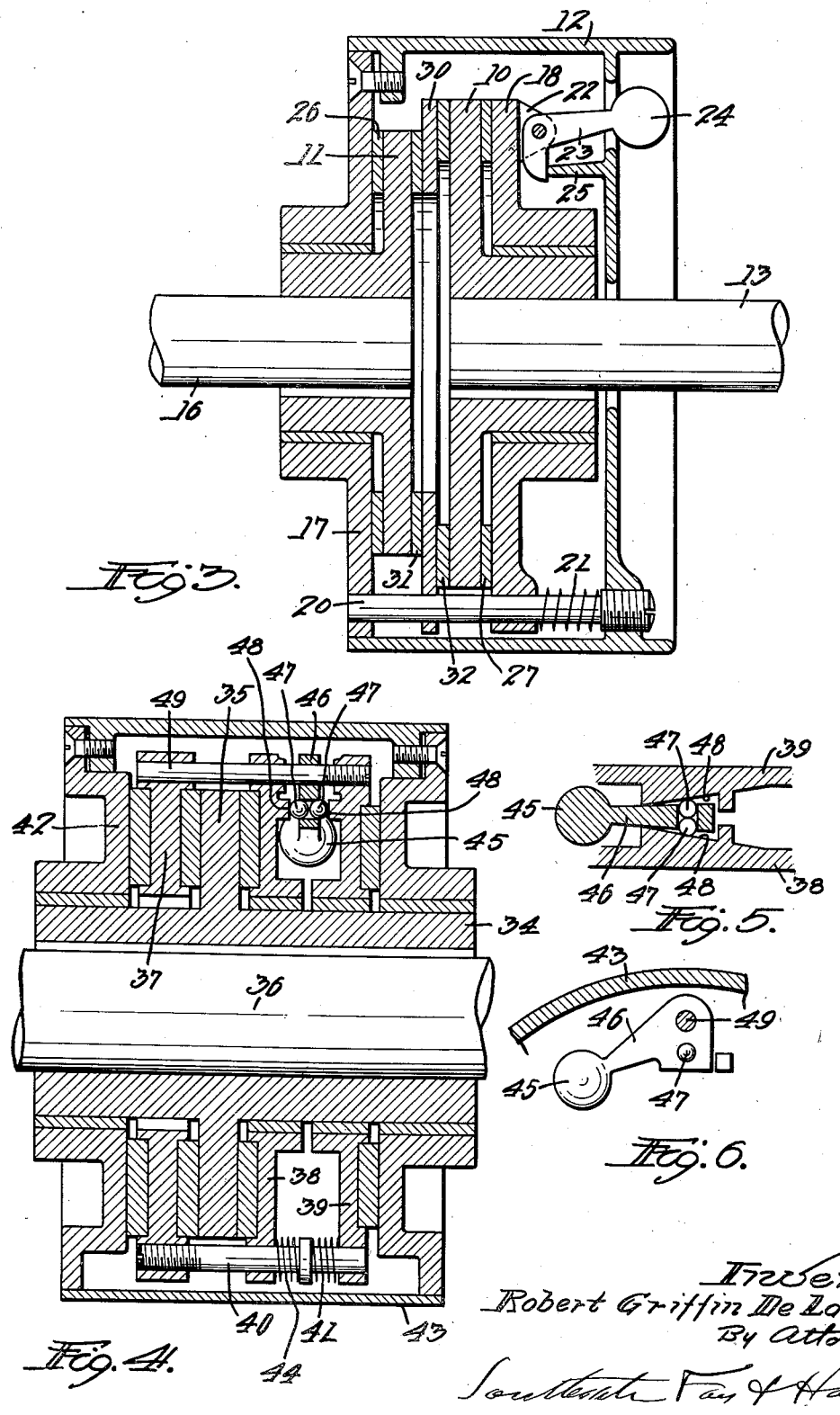

Patented Feb. 24, 1931

1,793,735

UNITED STATES PATENT OFFICE

ROBERT GRIFFIN DE LA MATER, OF WORCESTER, MASSACHUSETTS

AUTOMATIC ACCELERATING FRICTION CLUTCH

Application filed April 12, 1929. Serial No. 354,628.

The principal objects of this invention are to provide a friction clutch capable of automatic acceleration, practically from the instant the clutch is operated; to provide a construction of such a clutch in which only part or none of the torque of the driving unit is transmitted to the driven unit by direct frictional contact between them; to provide a clutch of this type with an entirely independent intermediate unit in such relationship to the other parts of the clutch as to be utilized as the only means of developing the pressure between the driving and driven units; to provide means whereby the automatic acceleration of the driven unit is obtained through the automatic acceleration of this intermediate unit with the attending increase in pressure between the driving and driven units; to provide for this automatic acceleration of this intermediate unit by having the initial driving torque on the intermediate unit from the driving element greater than the initial driven torque on the intermediate unit from the driven element, this being obtained by having the same initial pressure on a greater number of driving surfaces of the intermediate unit than driven surfaces, or by having the same initial pressure on a driving disc of the intermediate unit of greater effective radius than that on a driven disc, or by having an equal number of driving and driven surfaces in the intermediate unit but a greater initial pressure on the driving than driven surfaces, or by having the same initial pressure on the driving and driven frictional surfaces of the intermediate unit but a greater relative speed at the frictional contact between the driving and intermediate unit than between the driven and intermediate units; to provide this type of clutch to be used in conjunction with any other type of clutch or to have a disengaging element as a unitary part of itself to make it possible to disengage the driven load from the driver and leave the driver still running; to provide a clutch of this type with an intermediate unit built as a unitary part of a fly-wheel or other part of the driven element of the machine so that this part of the driven load may be accelerated with the intermediate unit and before the major part of the load without destroying the automatic acceleration of the principal load.

Other objects and advantages of the invention will appear hereinafter.

Reference is to be had to the accompanying drawings in which

Fig. 3 is a view similar to Fig. 1 showing the principle in modified form;

Fig. 4 is a similar view showing the invention as applied to a pulley, and

Figs. 5 and 6 are sectional and side views of the centrifugal weights therefor.

Figure 1:
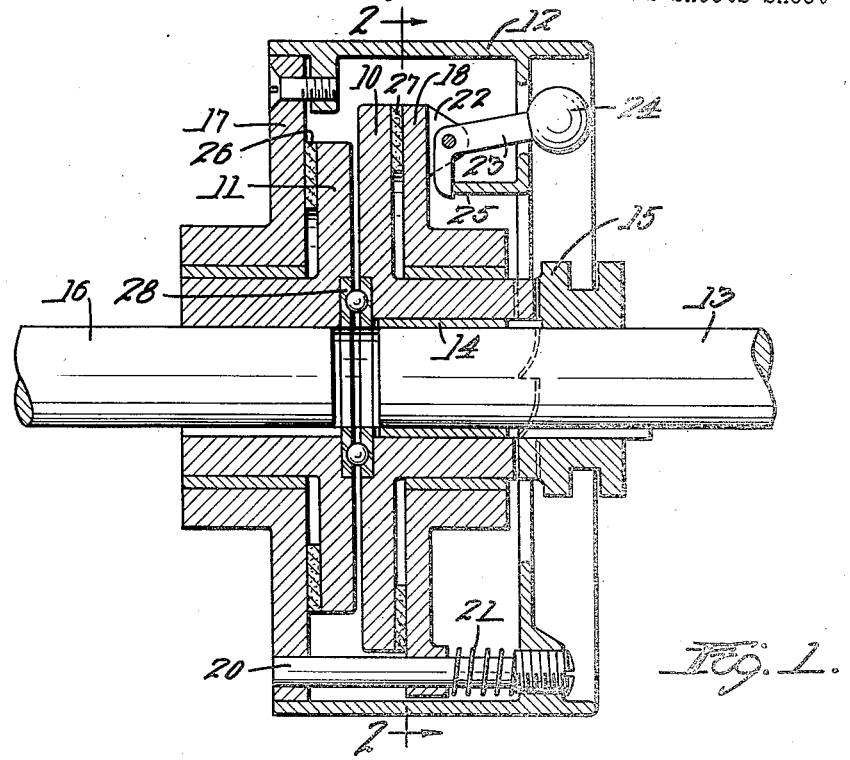
Fig. 1 is a diametrical sectional view of a clutch embodying the principle of this invention.
Figure 2:
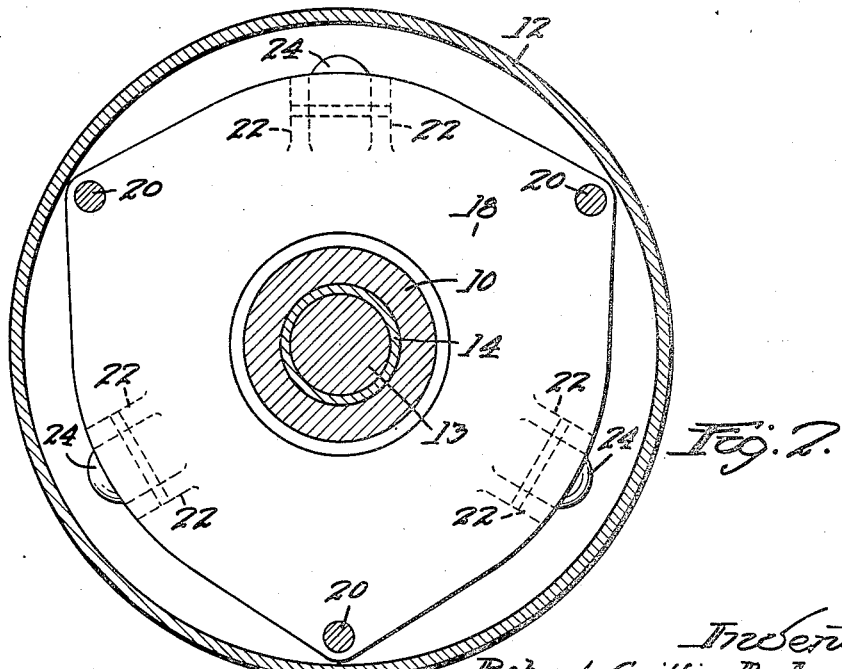
Fig. 2 is a sectional view of the same on the line 2—2 of Fig. 1.

Referring to Figs. 1 and 2 the essential features of the clutch shown herein are a driving unit comprising a disc 10, a driven unit comprising a disc 11 and an intermediate unit shown in the form of a shell 12 which may serve as a fly-wheel. In the form illustrated in Figs. 1 and 2 the driving unit 10 can be keyed to the shaft 13 but we have shown it loose thereon and running on a bushing 14. It is adapted to be coupled to the driving shaft 13 by means of a claw clutch 15. In this case the load may be started and stopped by starting and stopping the driver 10 by means of the claw clutch.

The driven unit 11 is keyed to the driven shaft 16. The intermediate unit which involves the shell 12 is provided with a flange 17 shown as secured to it for a purpose that will appear. Rotating with this intermediate unit and really forming a part thereof is a floating disc 18 arranged to be free to slide axially on the hub of the driving disc 10. Screwed into the shell 12 are a series of guide pins 20 which pass loosely through holes in the flange 17 and also pass through holes in the floating disc 18. Between the wall of the shell 12 and the floating disc are springs 21 on the pins tending to force the floating disc and the shell apart. On account of these pins 20 these two members 12 and 18 constitute a unit rotating as a single part.

On the floating disc 18 are lugs 22 on which are pivoted levers 23 provided with weights 24 which, when thrown out by centrifugal force, bring the ends of the levers 23 back against ribs 25 integrally mounted on the shell 12. Obviously the centrifugal weights with their levers are a part of this intermediate unit and all the three units, driving, driven and intermediate, may be revolved about their common axis independently and free of each other when the clutch is disengaged.

In the form herein shown, friction plates 26 and 27 are located between the elements 11 and 17 in one case and 10 and 18 in the other and fixed as by riveting to one of them in each case. It will be noted that the diameter of the plate 27 is greater than that of the plate 26. In this form the parts 10 and 11 are kept from frictionally bearing on each other by an anti-friction thrust bearing 28.

The springs 21 produce an equal light initial pressure on the friction surfaces of the plates 27 and 26. On account of this effect and the presence of the thrust bearing 28, all torque to be transmitted by the clutch from the driving unit to the driven unit has to be transmitted through the intermediate unit. The driving disc 10 can transmit a greater torque than the driven disc 11 with the same equal pressure on their respective friction plates 26 and 27 due to the greater effective radius of the driving friction surface on the plate 27.

In operation the driving disc 10 may be coupled by the clutch 15 or in any other way to any source of power. When the driving disc starts to turn it will tend to cause the intermediate unit to revolve with it. The driven disc 11, on account of the resistance of the load, will tend to hold the intermediate unit stationary. However, the greater effectiveness of the torque of the driving plate, on account of the difference in radius above mentioned and on account of the greater relative speed between the driving disc and intermediate unit as compared with the relative speed between the driven disc and intermediate unit, will overcome the resistance on the intermediate unit caused by the driven disc and the intermediate unit will start to revolve. When this happens, the centrifugal weights 24 will tend to fly out and through their levers will exert a greater and equal pressure on the plates 26 and 27. The speed of the intermediate unit and the pressure on the plates 26 and 27 will thus be built up until the torque transmitted through the intermediate unit from the driving unit to the driven unit is great enough to pick up the driven unit and bring it up to speed gradually.

This action in starting is an important feature of this invention, particularly when the source of power is a motor or other driver with a poor initial starting torque. It is also of great advantage when the initial load of the driven machine is greater than the running load due to the weights of the parts to be accelerated or to a heavy dead load. This clutch permits the driver to start at rest and get up to speed before the driven load is impressed upon it and then the driven load is taken up by it gradually. After the load is brought up to speed the clutch may, in most cases, act as any friction clutch. To stop the driven machine, the driver must be stopped or disconnected.

The relationship between the centrifugal weights and the driving or driven frictional surfaces may be so proportioned that any overload sufficient to cause the driver to slow down will decrease the pressure on the friction surfaces of the plates 26 and 27, caused by the centrifugal weights, and by slipping will relieve the motor or driver of this overload until the driver regains its speed. This clutch also can be so designed that under an overload the driven frictional surfaces will slip.

The required amount of initial pressure on the friction surfaces is obtained by adjusting the springs through the threaded parts of the pins. This is the essential adjustment for regulating the time allowed to permit the driver to get up to speed from rest, regardless of the ultimate load to be imposed upon it. The relationship between the weight of the centrifugal balls, and the effective radii of the friction surfaces of the plates 26 and 27 determines the time required for the clutch to pick up the load.

It will be understood, of course, that the exact construction shown in Fig. 1 can be modified by mounting the driving disc 10 directly on the shaft 13 and keying it thereto, doing away with the clutch 15 and starting and stopping the shaft 13 in any other desired way.

The form shown in Fig. 3 differs from the one just described in that it has been converted into a multiple disc clutch by separating the driving and driven elements 10 and 11 by a friction plate 30 and doing away with the bearing 28. In this case the friction plate 30 is provided with passages for the pins 20 and thus constitutes a part of the intermediate unit rotating with it at all times but free to slide on the pins 20. This plate, of course, takes the place of the thrust bearing shown in Fig. 1. Frictional contact with the driven member 11 preferably is smaller than the frictional contact with the driving member 10 for the same reasons as described above. Friction plates 31 and 32 are provided for an obvious purpose and fixed like the plates 26 and 27. Any number of frictional surfaces can be introduced.

In Fig. 4 this principle is shown as applied to an automatic accelerating friction pulley with multiple discs in the driving and driven units and of course, such a pulley can be designed with single discs. A driving hub 34 has a flange 35 and it is keyed to the driving shaft 36. The intermediate unit consists of discs 37, 38 and 39 connected by pins 40 and they all necessarily rotate together. These pins are shown as screwed into the disc 37 and the other discs are free to slide longitudinally on these pins, being perforated to receive them. Springs 41 on these pins tend to hold the discs 37 and 39 apart and springs 44 tend to hold the discs 37 and 38 toward each other. The driven unit consists of the end flanges 42 and the pulley face 43 which is positively secured to these flanges.

It will be noted that all of the frictional surfaces are of the same size in this case. However, the springs 41 exert a lighter initial pressure between the friction surfaces of the intermediate discs 37 and 39 and the driven flanges 42 than the initial pressure exerted by the springs 44 on the friction surfaces between the intermediate discs 37 and 38 and the driving flange 35. This difference in initial pressure on the driving and driven friction surfaces results in the same automatic accelerating of the intermediate unit and load as has been described in connection with the other parts of the invention herein illustrated. But this is accomplished without any unequal effective radii of the friction surface.

This pulley may be converted into a driving pulley by changing the adjustment on the springs. When the pressure caused by the springs on the frictional surfaces between the flanges 42 and the discs 37 and 39 is greater than the pressure caused by the springs on the frictional surfaces between the flange 35 and the discs 37 and 38, the pulley face with its end flanges becomes the driving element and the disc 35, together with the shaft 36 becomes the driven element.

In this also the same automatic accelerating feature is obtained. The centrifugal balls and levers 45 and 46 have the same effect as in the other cases. They are pivoted on longitudinal shafts 49. Each lever has two balls 47 engaging two converging surfaces 48 on the discs 38 and 39. As the balls 45 fly out, the bearing balls 47 move further into the tapering space between these surfaces.

The driving and driven units may be reversed by changing the adjustment of the springs which determine the initial pressure on the friction surface.

Although I have illustrated and described only three forms of the invention I am aware of the fact that other modifications can be made therein by any person skilled in the art without departing from the scope of the invention as expressed in the claims.

Therefore, I do not wish to be limited in this respect but what I do claim is:—

1. In an automatic accelerating friction clutch, the combination with a driving element and a driven element, of an intermediate unit having two parts relatively movable in an axial direction and adapted to engage the said driving and driven elements frictionally, means for exerting an initial pressure to move said two parts toward the driving and driven elements and means connected with the intermediate unit for forcing the two parts of the unit more firmly against the driving and driven elements with an increase in speed of the driving element.

2. In an automatic accelerating friction clutch, the combination with a driving disc and a driven disc, of an intermediate unit having two plates in position to engage with a frictional contact the opposite surfaces of said two discs, yielding means for exerting an initial pressure on both of said frictional surfaces, said intermediate unit comprising a floating disc on the driving side of the clutch constituting a surface for exerting frictional pressure on the driving disc and means operable by centrifugal force mounted on the floating disc for increasing the pressure on the frictional surfaces as the intermediate unit rotates at a higher speed.

3. In an automatic accelerating friction clutch, the combination with a driving disc and a driven disc, of an intermediate unit in initial contact with the driven disc and the driving disc, centrifugal weights carried by the intermediate unit and means by which said centrifugal weights transmit pressure to the driving and driven discs only through the intermediate unit.

4. In a friction clutch, the combination with a driving disc and a driven disc, of friction plates mounted on the outer sides of said discs, the friction plate on the driving disc having a greater diameter than the other, and an intermediate unit having an end flange engaging the friction plate of the driven disc and having a floating disc movable longitudinally but not otherwise with respect to the intermediate unit and engaging the outer surface of the friction plate of the driving disc, centrifugal balls carried by the floating disc and means whereby when the balls fly out they will move the floating disc and the flange on the opposite end of the intermediate unit toward each other to increase the friction.

5. In an automatic accelerating friction clutch, the combination with a driving and a driven disc adjacent to each other, friction plates on their outer surfaces, an intermediate unit comprising a cylindrical portion and an end flange fixed together, the end flange bearing on the friction plate of the driven disc, a plurality of longitudinal pins carried by the intermediate unit, said pins being adjustable, a floating disc constituting a part of the intermediate unit having perforations for the floating pins, springs on said pins to provide an initial pressure on the driving disc which said floating disc engages and centrifugal means for increasing the pressure between the floating disc and the driving disc and also between the driven disc and the intermediate unit flange as the speed of the intermediate unit increases.

6. In an automatic accelerating friction clutch, the combination with a driving shaft, a driven shaft, a disc fixed on the driving shaft and a disc fixed on the driven shaft, of friction plates between said discs, an intermediate unit comprising a floating disc movable longitudinally, springs behind the floating disc for furnishing an initial pressure on the driving and driven discs by the floating disc and means carried by the floating disc for increasing this pressure as the speed of the intermediate unit accelerates.

7. In a friction clutch, the combination of a driving element, a driven element, a friction surface on the driving element and a friction surface on the driven element, of an intermediate floating unit having a friction surface adapted to coact with the friction surface of one of said elements and a movable friction surface adapted to coact with the friction surface of the other element, means for maintaining an initial pressure between the friction surfaces of the driving element, the floating unit and the driven element and means carried by the floating unit for adding to said initial pressure as the speed of the floating unit increases.

8. In an automatic accelerating friction clutch, the combination with a driving and a driven disc adjacent to each other, friction plates on their outer surfaces, an intermediate unit bearing on the friction plate of the driven disc, a plurality of longitudinal pins carried by the intermediate unit, a floating disc constituting a part of the intermediate unit having perforations for the pins, springs on said pins to provide an initial pressure on the driving disc which said floating disc engages and centrifugal means for increasing the pressure between the floating disc and the driving disc and also between the driven disc and the intermediate unit as the speed of the intermediate unit increases.

9. In a friction clutch the combination of a driving element, a driven element and a friction surface on each of said elements, of an intermediate floating unit having friction surfaces adapted to coact with the two friction surfaces respectively, means for maintaining an initial pressure between the friction surfaces of the driving element, the floating unit and the driven element and means carried by the floating unit for adding to said initial pressure as the speed of the floating unit increases, whereby the driving element can be made the driven element by mere adjustment of the relative amount of initial friction between the floating unit and the driving and driven elements respectively.

In testimony whereof I have hereunto affixed my signature.

ROBERT GRIFFIN DE LA MATER.